(12) United States Patent
T

(10) Patent No.: US 11,409,901 B2
(45) Date of Patent: Aug. 9, 2022

(54) DATA SECURITY IN A PEER-TO-PEER NETWORK

(71) Applicant: SAP SE, Walldorf (DE)

(72) Inventor: Saranyaa T, TamilNadu (IN)

(73) Assignee: SAP SE, Walldorf (DE)

( * ) Notice: Subject to any disclaimer, the term of this patent is extended or adjusted under 35 U.S.C. 154(b) by 397 days.

(21) Appl. No.: 16/211,659

(22) Filed: Dec. 6, 2018

(65) Prior Publication Data
US 2020/0184097 A1    Jun. 11, 2020

(51) Int. Cl.
| | |
|---|---|
| *G06F 21/62* | (2013.01) |
| *H04L 9/32* | (2006.01) |
| *H04L 9/40* | (2022.01) |
| *H04L 9/06* | (2006.01) |

(52) U.S. Cl.
CPC ........ *G06F 21/6245* (2013.01); *H04L 9/0643* (2013.01); *H04L 9/3236* (2013.01); *H04L 63/061* (2013.01); *G06F 2221/2101* (2013.01); *H04L 2209/38* (2013.01)

(58) Field of Classification Search
CPC ......... G06F 21/6245; G06F 2221/2101; H04L 9/0643; H04L 9/3236; H04L 63/061; H04L 2209/38
See application file for complete search history.

(56) References Cited

U.S. PATENT DOCUMENTS

| | | | |
|---|---|---|---|
| 10,698,879 B1 * | 6/2020 | Todd | ................... H04L 67/1097 |
| 2017/0364701 A1 * | 12/2017 | Struttmann | ......... G06F 16/2282 |
| 2018/0204213 A1 * | 7/2018 | Zappier | ................... H04L 63/10 |

OTHER PUBLICATIONS

Benet, Juan, "IPFS—Content Addressed, Versioned, P2P File System," Jul. 14, 2014, Cornell University (Year: 2014).*
Mohanty, D., "Ethereum Architecture" In: "Ethereum for Architects and Developers," Oct. 31, 2018, Apress, Berkely, CA, pp. 45-51 (Year: 2018).*
Jovovic et al., "5G, Blockchain and IPFS: A General Survey with Possible Innovative Applications in Industry 4.0," Nov. 6-8, 2018, Dubrovnik, Croatia. (Year: 2018).*

(Continued)

*Primary Examiner* — Matthew Smithers
*Assistant Examiner* — Alexander R Lapian
(74) *Attorney, Agent, or Firm* — Mintz Levin Cohn Ferris Glovsky and Popeo, P.C.

(57) ABSTRACT

A data protection implementation solution includes utilizing a peer-to-peer network and incorporating an auditing method to record and/or track transactions related to a customer's data. A private peer-to-peer network such as inter planetary file system (IPFS) is used to achieve secured and fast data accessibility while also managing data modifications. An auditing method such as blockchain is used to record activity related to data within the IPFS network. The IPFS network may include a plurality of nodes, among which data is distributed. Devices are registered with the network, and public keys, private keys, and node identifiers are used to authenticate users and secure the data. By incorporating blockchain with the IPFS network, file commit transactions are validated and a clear ledger regarding time of modification and count of file edits is provided.

6 Claims, 10 Drawing Sheets

(56) References Cited

OTHER PUBLICATIONS

Rajalakshmi et al., "A Blockchain and IPFS based framework for secure Research record keeping," 2018, International Journal of Pure and Applied Mathematics, vol. 119 No. 15, pp. 1437-1442 (Year: 2018).*
"Learn to securely share files on the blockchain with IPFS!," Coral Health, Feb. 20, 2018 (Year: 2018).*
Dey et al., "HealthSense: A medical use case of Internet of Things and blockchain," Dec. 7-8, 2017, 2017 International Conference on Intelligent Sustainable Systems (ICISS) (Year: 2017).*
Chen et al., "An improved P2P file system scheme based on IPFS and Blockchain," Dec. 11-14, 2017, 2017 IEEE International Conference on Big Data (Big Data) (Year: 2017).*
Beck, et al., Beyond Bitcoin: The Rise of Blockchain World, Computer, 2018, pp. 54-58, vol. 51, Issue 2.
Chen, et al., An improved P2P file system scheme based on IPFS and Blockchain, IEEE Xplore, 2017, pp. 2652-2657.
IPFS, IPFS powers the Distributed Web, 10 pages. Retrieved from: https://ipfs.io/.
Matsunaga, et al., On the use of machine learning to predict the time and resources consumed by Applications, 10th IEEE/ACM International Conference on Cluster, Cloud and Grid Computing, CCGrid 2010, pp. 495-504.

\* cited by examiner

DATA SECURITY IN A PEER-TO-PEER NETWORK

FIELD

The present disclosure generally relates to securing access to a customer's data and, more specifically, to providing secure and efficient data access and data tracking using a peer-to-peer network.

BACKGROUND

In an enterprise landscape, in which a multitude of disparate users are connected over a network, data security for customers' confidential data is essential. In such environments, a customers' data needs to be securely protected while also easily and quickly accessible and shared among verified users. It is also of interest to maintain records of and/or track modifications made to the data.

SUMMARY

Methods, systems, and articles of manufacture, including computer program products, are provided for a data protection solution for customers' confidential data by utilizing a peer-to-peer network and by incorporating an auditing method to record and/or track transactions related to the customers' data.

According to aspects of the current subject matter, a computer-implemented method includes: receiving, by a processing device and from a user device in a network, a file to be uploaded to the network, the network including a plurality of nodes including the user device, where each of the plurality of nodes has a public key, a private key, and a node identifier; generating, by the processing device, a unique hash value for the file; storing, by the processing device, the hash value of the file in a subset of the plurality of nodes; generating, by the processing device, a hash table, the hash table including an indication of the file and the hash value; creating, by the processing device, a blockchain representation of the file, the blockchain representation including at least the hash value of the file; and providing, by the processing device, the file to the user device and/or a requesting device, where the file is provided upon verification of the user device and/or the requesting device.

In an inter-related aspect, a system includes at least one data processor, and at least one memory storing instructions which, when executed by the at least one data processor, result in operations including: receiving, from a user device in a network, a file to be uploaded to the network, the network including a plurality of nodes including the user device, where each of the plurality of nodes has a public key, a private key, and a node identifier; generating a unique hash value for the file; storing the hash value of the file in a subset of the plurality of nodes; generating a hash table, the hash table including an indication of the file and the hash value; creating a blockchain representation of the file, the blockchain representation including at least the hash value of the file; and providing the file to the user device and/or a requesting device, where the file is provided upon verification of the user device and/or the requesting device.

In an inter-related aspect, a non-transitory computer-readable storage medium includes program code, which when executed by at least one data processor, causes operations including: receiving, from a user device in a network, a file to be uploaded to the network, the network including a plurality of nodes including the user device, where each of the plurality of nodes has a public key, a private key, and a node identifier; generating a unique hash value for the file; storing the hash value of the file in a subset of the plurality of nodes; generating a hash table, the hash table including an indication of the file and the hash value; creating a blockchain representation of the file, the blockchain representation including at least the hash value of the file; and providing the file to the user device and/or a requesting device, where the file is provided upon verification of the user device and/or the requesting device.

In some variations, one or more of the features disclosed herein including the following features can optionally be included in any feasible combination. The file may be provided to the user device and/or the requesting device by matching the file with the hash key of the file from a node of the plurality of nodes, where the node includes a nearest node including the hash value. The file may be signed with the private key. The user device and the requesting device may authenticate each other by exchanging public keys and determining if a hash of a respective public key is equivalent to a corresponding node identifier. The processing device may receive from the user device a modified version of the file; the processing device may generate a new hash value for the modified version of the file; and the processing device may append the new hash value to the blockchain representation of the file. The processing device may store the new hash value in a second subset of the plurality of nodes. The processing device may append the new hash value in the hash table.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
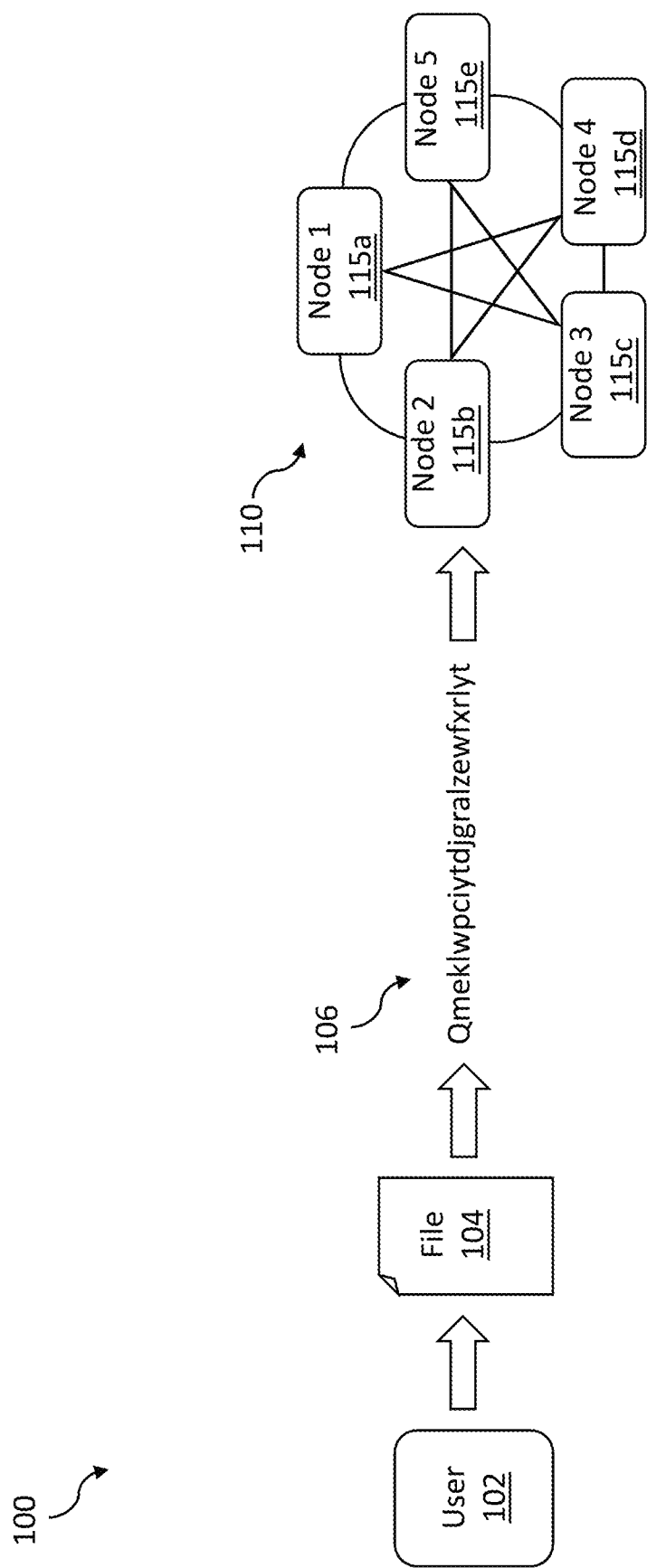
FIG. 1 is a block diagram illustrating aspects of a content-based distributed method consistent with implementations of the current subject matter.

Like labels are used to refer to same or similar items in the drawings.

DETAILED DESCRIPTION

In a cloud-based enterprise landscape, of which a potentially large number of customers are a part, secured access to a customer's confidential data presents a number of challenges. For example, data security, auditing, memory management of resources, and/or efficient system architecture are just some of the factors that need to be addressed. Moreover, such factors may need to be addressed while implementing general data protection regulation (GDPR).

Implementations of the current subject matter provide a data protection solution for customers' confidential data by utilizing a peer-to-peer network and by incorporating an auditing method to record and/or track transactions related to the customers' data. Consistent with some implementations of the current subject matter, a private peer-to-peer network such as inter planetary file system (IPFS) is used to achieve secured and fast data accessibility while also managing data modifications. Consistent with some implementations of the current subject matter, an auditing method such as blockchain is used to record activity related to data within the IPFS network.

IPFS is a communication protocol that provides a distributed method of storing files. The IPFS network includes a plurality of nodes that are used for content-based addressing. In contrast to IPFS, hypertext transfer protocol (HTTP) is a client-server based architecture. The HTTP architecture employs a centralized server that stores data. Every time data is requested, a client is required to reach out to the server to fetch the required data. This limitation of communicating with the server means that to access a specific piece of data, a particular location (the centralized server) needs to be accessed even if that same piece of data is available somewhere closer. Such location-based addressing, in contrast to the content-based addressing provided by IPFS, in which a centralized data source is accessed without regard to location results in increased latency issues that are not a factor in IPFS.

File security in IPFS is achieved by creating, for every file uploaded to the IPFS network, a unique hash key, and storing the unique hash key in a distributed hash table. Each hash key in turn points to the nodes in the IPFS network. When a file is modified, a new hash key is appended in the hash table for the file. When a user requests a particular file, the hash key of the respective file is searched and the matching file is served from the nearest node. In this way, data is spread across the network of the nodes, which are coordinated to enable efficient access and lookup between one another.

IPFS uses Markle Directed Acyclic Graph (DAG), which is a data structure in which hashes are used to reference data blocks and objects. Each node of the DAG stores the hash key of the file. That is, the objects of the DAG are the file's hash key, and the data blocks of the DAG has its own hash value. Any object that is edited is stored as a new data block of the DAG. Moreover, existing data blocks cannot be overwritten with a new hash key, thus maintaining the integrity between the blocks.

Consistent with implementations of the current subject matter, the IPFS peer-to-peer network is built as a private network within an organization, thereby avoiding file accessibility outside of the organization. When files are secured in the IPFS network, the files are protected for GDPR. Here the objects for the DAG are customer confidential files. For each file, a unique hash value is generated. This generated hash value for the file may, according to some aspects of the current subject matter, begin with "Qm," which is easily identifiable and indicates it belongs to the IPFS network.

IPFS is a self-certifying file system, which uses public-key cryptography to self-certify objects published by users of the network. Nodes are identified by node identifiers (node IDs). Each node on the network has a set of public keys, private keys, and a node ID which is the hash of its public key. Nodes can therefore use their private keys to "sign" any data objects they publish, and the authenticity of this data can be verified using the sender's public key. As an example of data verification, consider 'A' as a sender and 'B' as a receiver. When 'A' sends a file, he/she encrypts the file with a public key. When 'B' receives the file, to read the file received from 'A', he/she uses the private key to unlock the content which was encrypted with the public key. The private key is shared in advance so that only known and authorized persons may access the files. This may be maintained by an administrator, for example. For every private key, there is only one public key. To read something encrypted with the public key, the user needs to know the corresponding private key.

FIG. 1 is a block diagram representation 100 illustrating the content-based distributed method of IPFS consistent with implementations of the current subject matter. A user 102 presents a file 104 for uploading to a particular IPFS network 110, which includes a plurality of nodes 115$a,b,c,d,e$. The IPFS network 110 generates a hash key 106 for the file 104. The IPFS network 110 stores the hash keys of each uploaded file in the nodes 115$a,b,c,d,e$. Although five nodes 115$a,b,c,d,e$ are shown as forming the IPFS network 110 in FIG. 1, this is purely exemplary and fewer or additional nodes may be included in the IPFS network 110.

Figure 2:
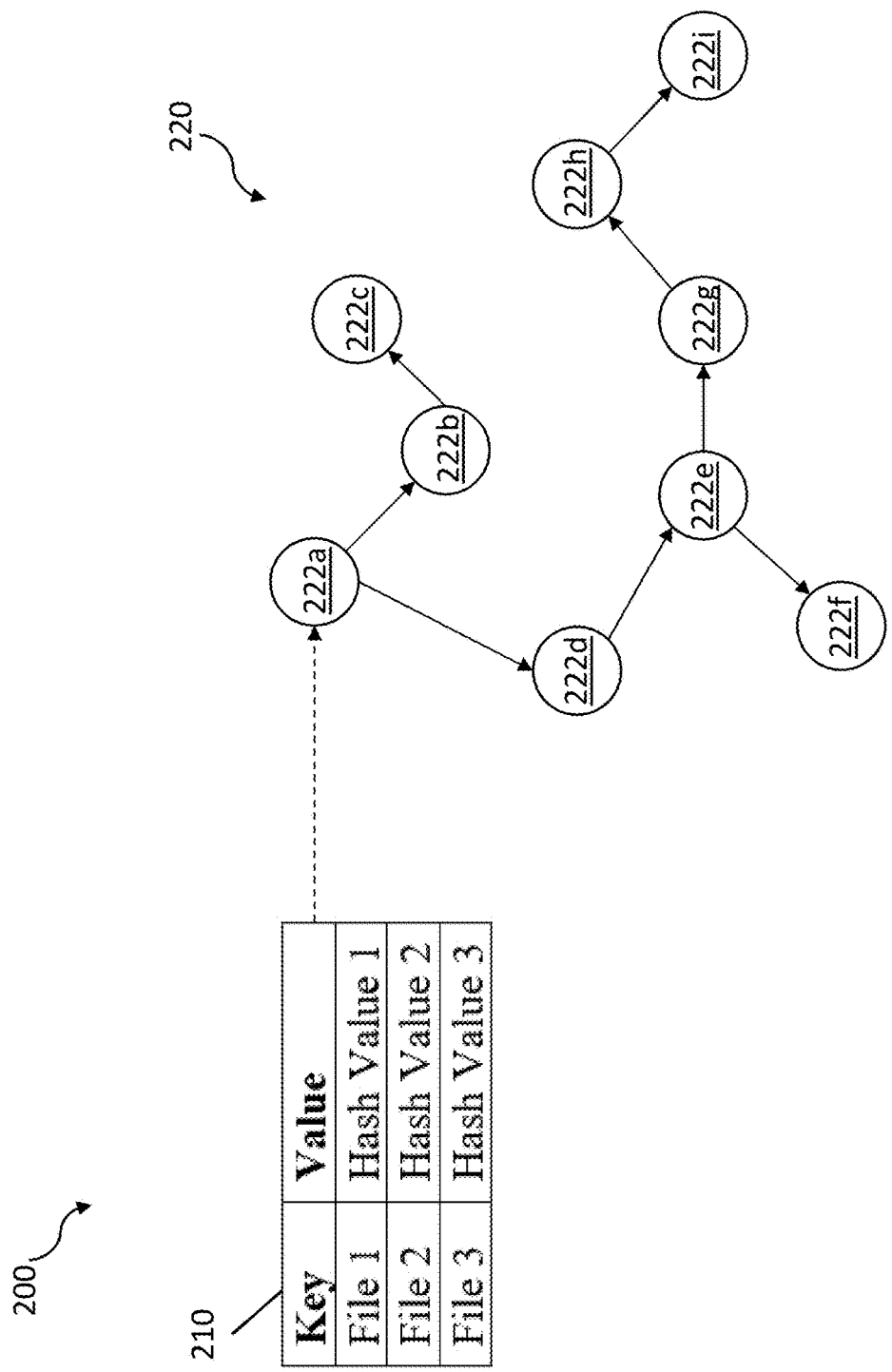
FIGS. 2, 3, and 4 are diagrams illustrating aspects of a directed acyclic graph consistent with implementations of the current subject matter.

FIG. 2 is a block diagram representation 200 illustrating aspects of a DAG 220 consistent with implementations of the current subject matter. A hash table 210 includes several files (File 1, File 2, File 3) and their respective hash keys or values (Hash Value 1, Hash Value 2, Hash Value 3). Each node 222 of the DAG 220 is the hash value of the file, which can be accessed by authenticated users of the IPFS network 110.

Figure 3:
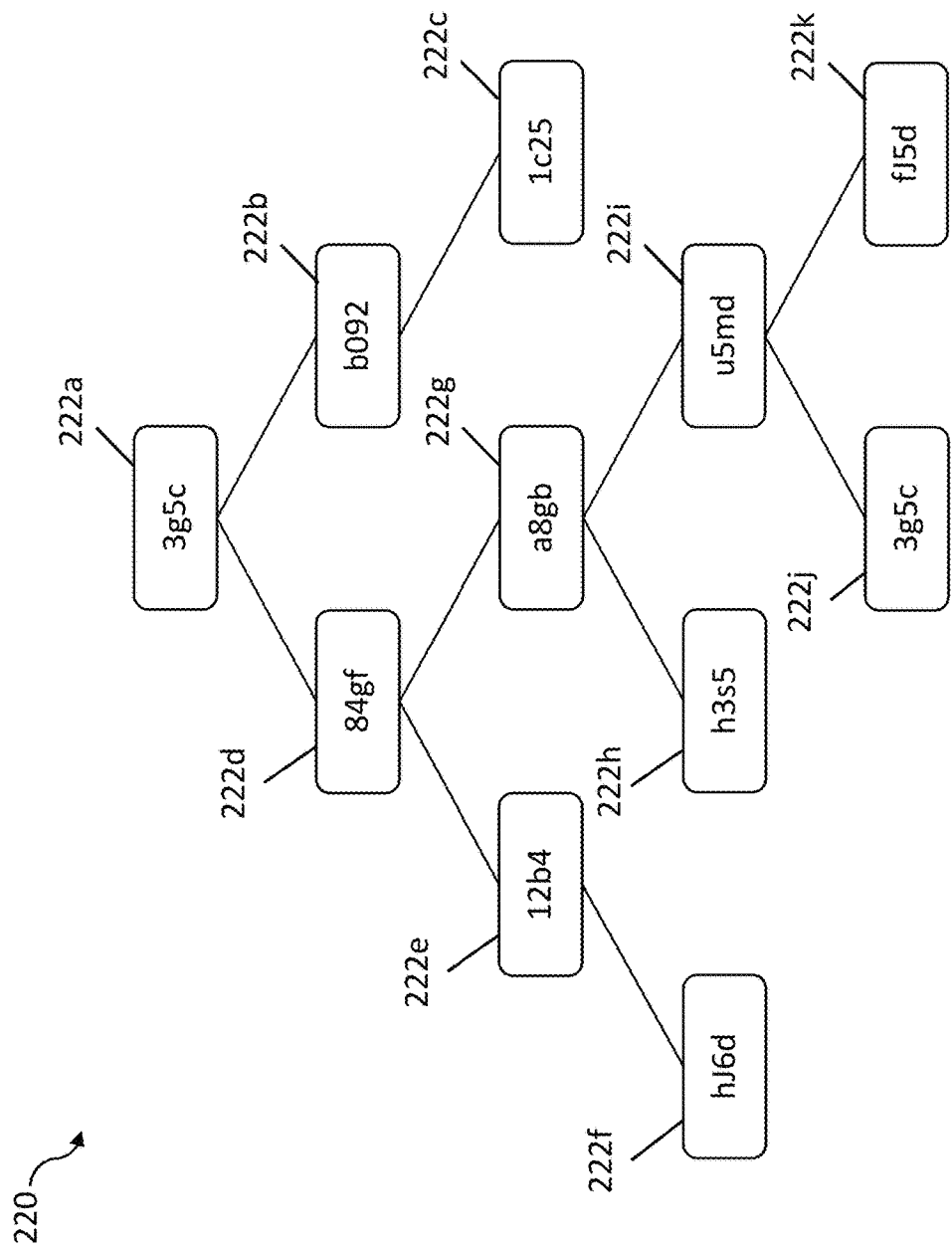
Figure 4:
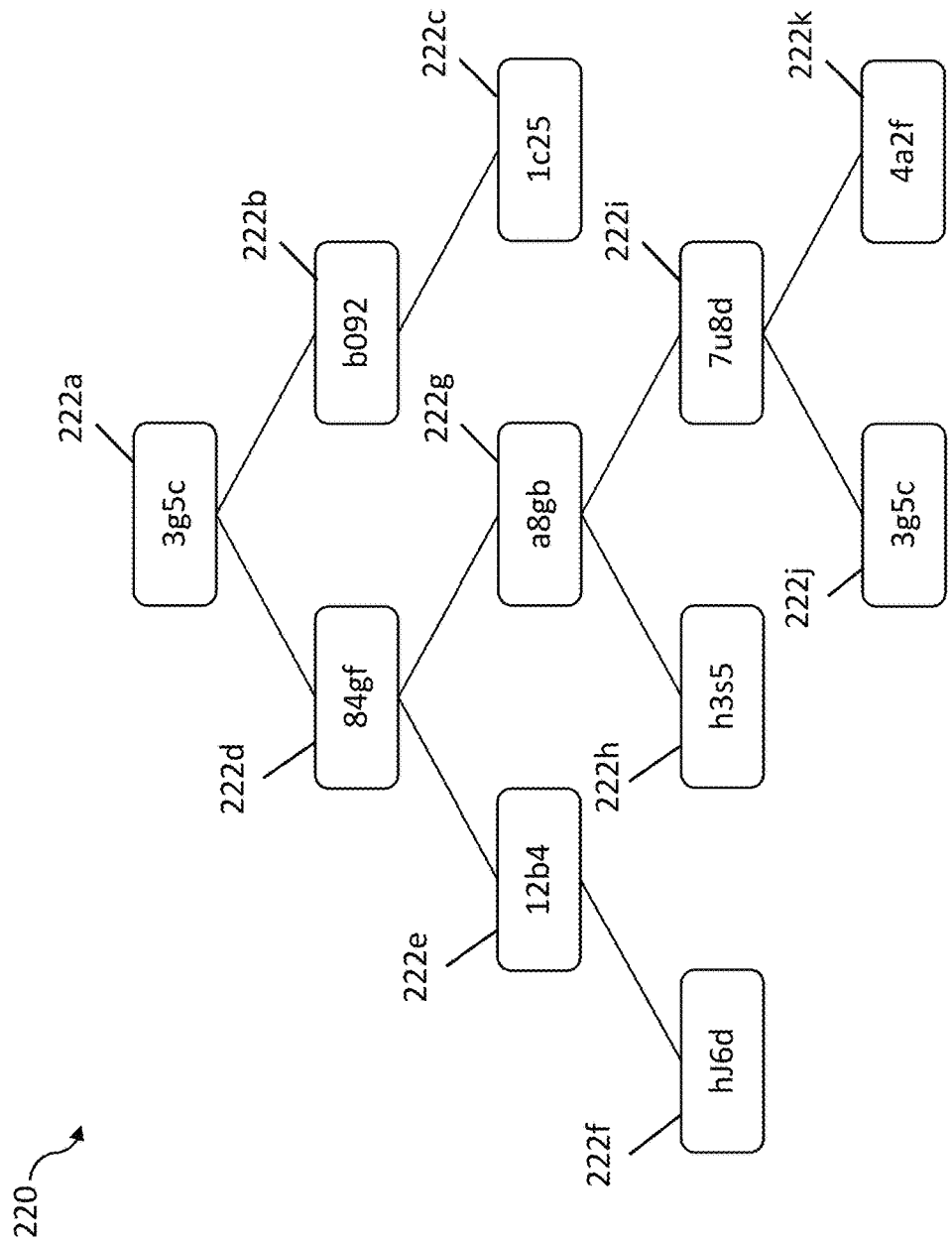

FIGS. 3 and 4 illustrate additional aspects of the DAG 220 consistent with implementations of the current subject matter. In FIG. 3, a graph with original files is shown, where each data block of the DAG 220 holds its own hash value, and objects are IPFS-generated hash values for files consistent with implementations of the current subject matter. In FIG. 4, the file or content in node 222$k$ is edited, and a new value ("4a2f") is assigned to the node 222$k$. Any newly edited file is added as a new node in the structure of the DAG 220. Integrity between the blocks is maintained, which provides for version control and allows for retrieval of every version of the files.

Figure 5:
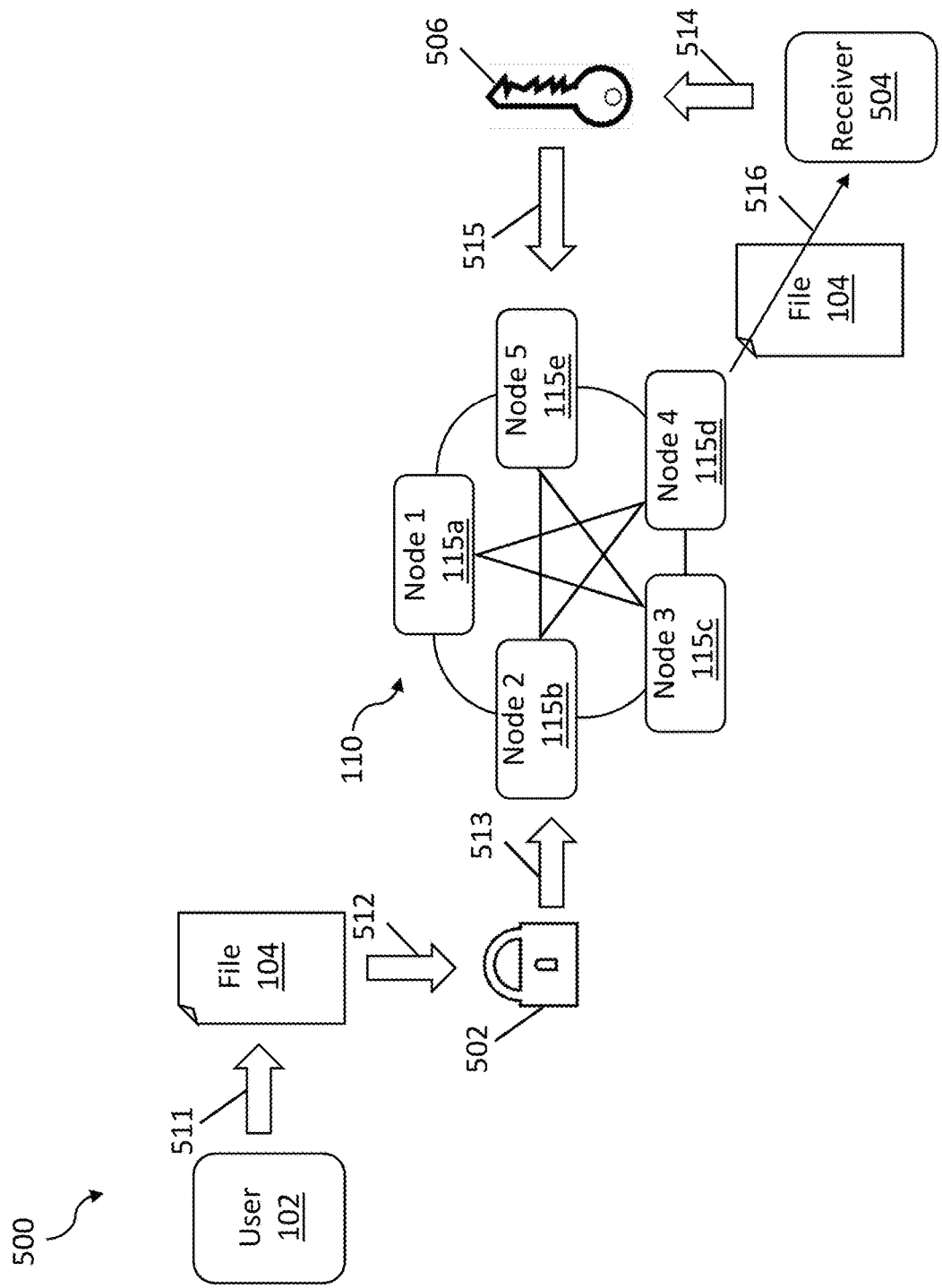
FIG. 5 is a system flow diagram illustrating aspects of file authentication consistent with implementations of the current subject matter.

Consistent with additional implementations of the current subject matter, upon first connecting, peers exchange public keys and check if the hash (public key) equals the node ID. If not, the connection is terminated. FIG. 5 illustrates, in a system flow diagram 500, aspects of file authentication in the IPFS network 110 consistent with implementations of the current subject matter. As previously described, the user 102 presents the file 104 for uploading to the particular IPFS network 110 (511), which in the representation shown in FIG. 5 includes nodes 115a,b,c,d,e. The file 104 is encrypted with a public key 502 of a receiver 504 (512). The IPFS network 110 generates the hash key 106 for the file 104 (513). The IPFS network 110 stores the hash keys of each uploaded file in the nodes 115a,b,c,d,e. When the receiver 504 wishes to access the file 104, the private key 506 is provided (514), which is used to unlock the file 104 (515). The file 104 is accessed from the IPFS network 110 (516) and provided to the receiver 505 (517).

Consistent with implementations of the current subject matter, the hash value of each file may be stored in a blockchain and distributed across the IPFS network 110 within an organization. For example, an application programming interface (API) may be used as an intermediary to sore the values to blockchain. The use of blockchain with the IPFS network 110 may protect information from being accessed by outsiders of the organization. Blockchain is a decentralized distributed ledger that is used to record transactions. Each block in a chain is addressed by a unique hash value, and integrity between blocks is maintained by storing the hash values of previous blocks in new blocks. That is, each block has two values: a self-hash value (the block's own hash value) and previous hash value (the previous block's hash value). The initial block (the genesis block) has only its self-hash value and no previous hash value. The second block has its self-hash value and the previous hash value which is the hash value of the genesis block. And so on with the following blocks. By holding these values, the blocks stay interconnected and maintain integrity.

Figure 6:
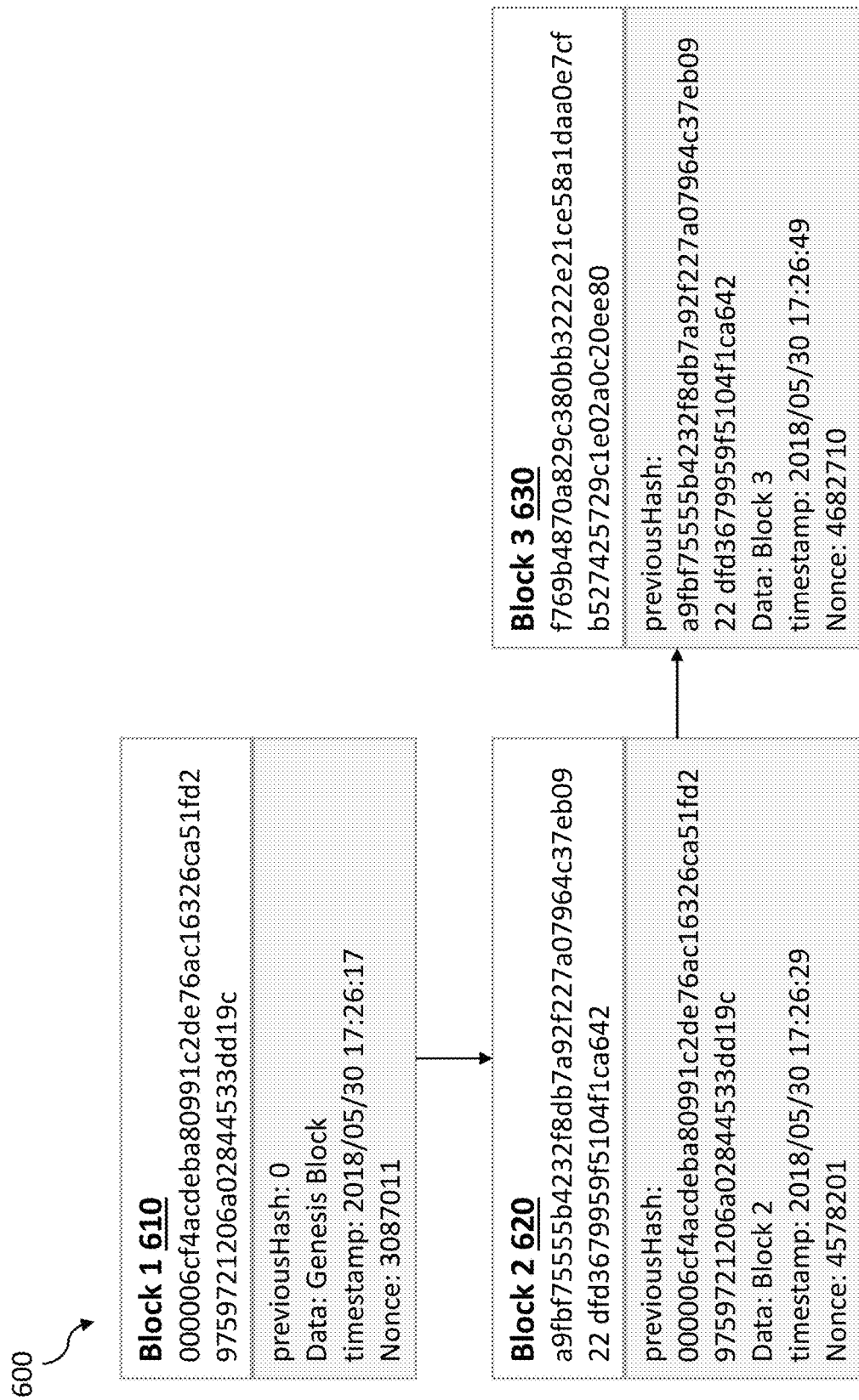
FIG. 6 is an example blockchain representation consistent with implementations of the current subject matter.

The blocks may also include additional details, such as creation time, the data held in the block, and company information or identifiers. Consistent with implementations of the current subject matter, each block is verified and holds only valid transactions. This verification may be accomplished by block mining. With reference to FIG. 6, an example blockchain representation 600, with Block 1 610, Block 2 620, and Block 3 630, is provided. As shown in each block 610, 620, 620, each block's unique hash value is provided, as is an indication of previous hash, data, timestamp, and nonce, which refers to a random or pseudo-random number issued in an authentication protocol to ensure that old communications cannot be used in replay attacks. According to some aspects of the current subject matter, as accessing the files with hash values may not be user friendly, Domain Name System (DNS) may be used to create simpler names.

Figure 7:
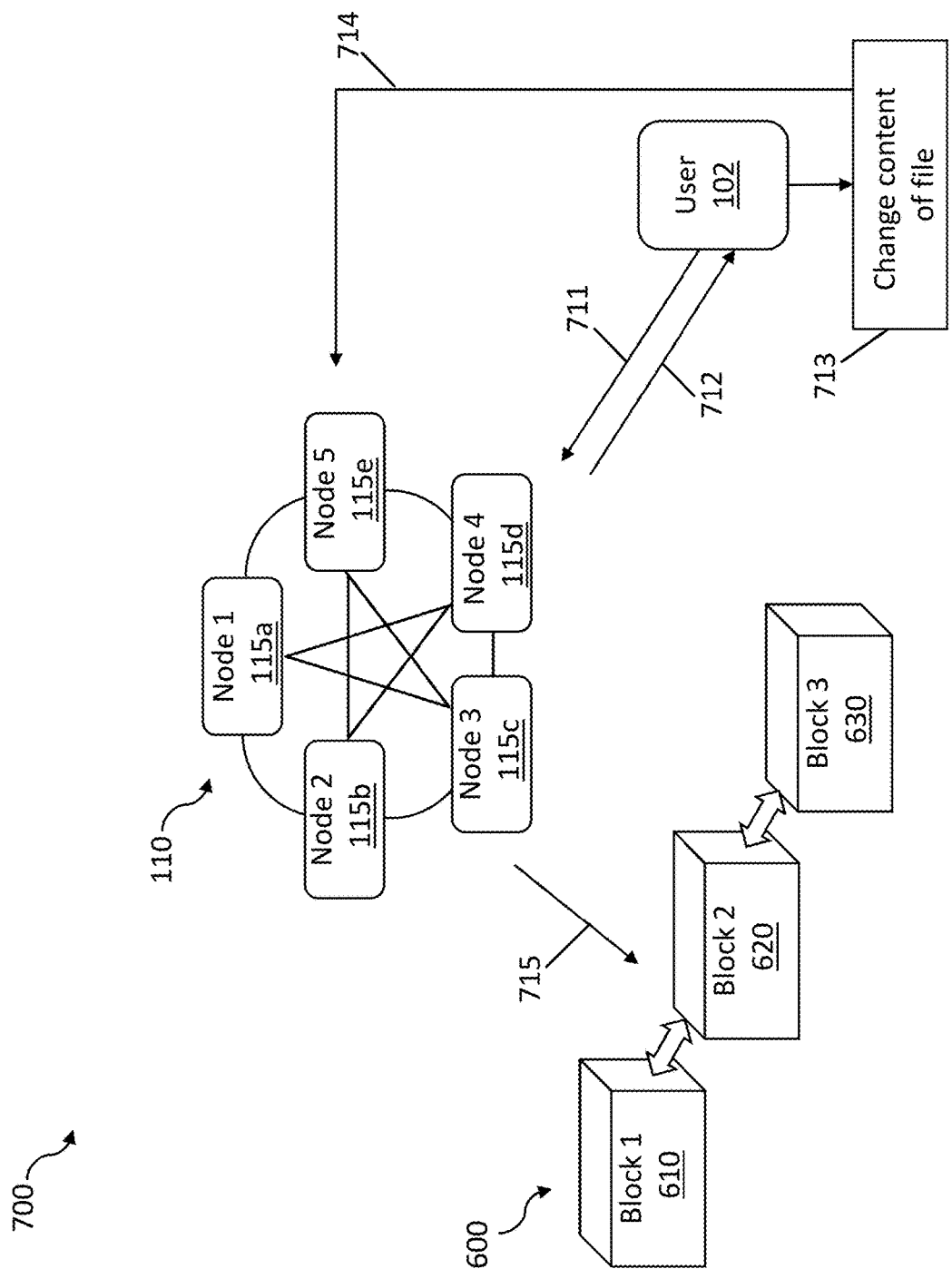
FIG. 7 is a system flow diagram illustrating aspects of incorporating a blockchain representation with a peer-to-peer network consistent with implementations of the current subject matter.

FIG. 7 is a system flow diagram 700 illustrating aspects of incorporating a blockchain representation, such as the blockchain representation 600, with the IPFS network 110 consistent with implementations of the current subject matter. The user 102 requests a file from the IPFS network 110 (711). The IPFS network 110 sends the requested file to the user 102 (712). The user 102 incorporates edits or otherwise changes content of the file (713), at which point the modified file has a new hash value assigned to it in the IPFS network 110 (714). Moreover, the new hash value for the modified file is appended to the blockchain 600 (715). Thus, according to implementations of the current subject matter, the blockchain 600 incorporated with the IPFS network 110 provides for auditing of the network files, such as auditing modified versions of the files. The hash values for each file are uploaded to the IPFS network 110 and stored in blockchain. When a particular file is edited, a new hash value is appended to the blockchain 600, with the file name and the new hash value, for that file. By incorporating blockchain with the IPFS network 110, file commit transactions are validated and a clear ledger regarding time of modification and count of file edits is provided.

Figure 8:
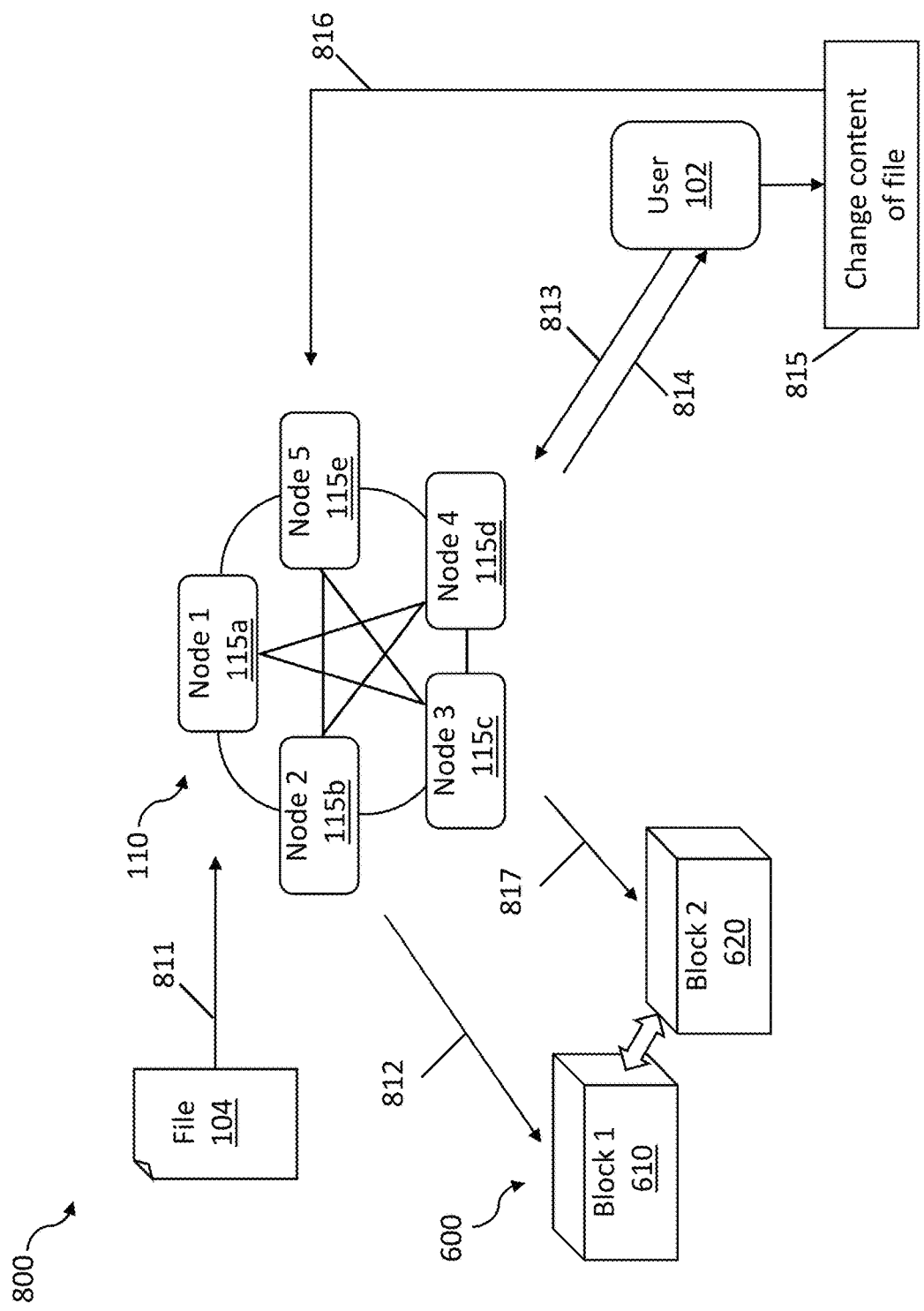
FIG. 8 is a block diagram illustrating an architecture consistent with implementations of the current subject matter.

FIG. 8 is a block diagram illustrating an overall architecture and system flow diagram 800 consistent with implementations of the current subject matter. In particular, the architecture 800 illustrates the incorporation of blockchain with the IPFS network 110. As shown, customer confidential files 104, which may include old and new files, are stored to the IPFS network 110 (811). The first block 610 of the blockchain representation 600 for a particular file is created (812). At some time later, the user 102 requests a file from the IPFS network 110 (813). The IPFS network 110 provides the requested file to the user 102 (814). The user 102 modifies the file (815). The IPFS network 110 assigns a new hash value to the modified file (816). The new hash value for the modified file is appended to the blockchain 600 as the second block 620 (817).

Consistent with implementations of the current subject matter, the IPFS network 110, by utilizing the DAG model as described herein, provides for version control by distributing versions of files. In Merkle DAG, changes are captured to a file system tree in a distributed-friendly way. Links to other objects are embedded, forming a Merkle DAG. Typical versioning metadata (branches, tags, etc.) are simply pointer references, and thus are inexpensive to create and update. Version changes only update references or add objects. Distributing version changes to other users requires transferring objects and updating remote references. The most recently generated hash value is appended to the blockchain. Thus, multiple hash values in blockchain infer multiple file edits.

Figure 9:
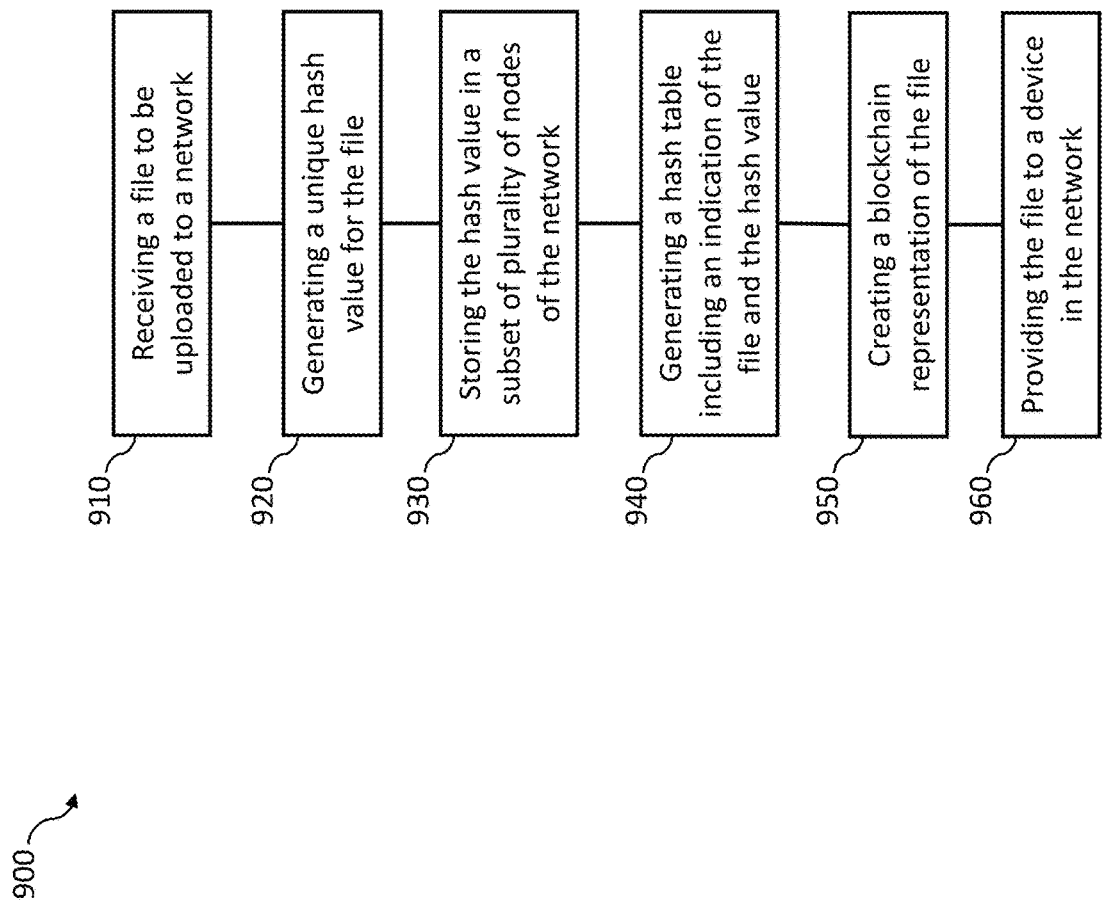
FIG. 9 depicts a flowchart illustrating a process for file distribution and secure access consistent with implementations of the current subject matter.

FIG. 9 depicts a flowchart 900 illustrating a process for file distribution and secure access in the IPFS network 110 consistent with implementations of the current subject matter. At 910, a file to up be uploaded to the IPFS network 110 is received. The file may be provided by the user device 102. Moreover, the user device 102 may provide a plurality of files to be uploaded to the IPFS network 110. As described herein, the IPFS network 110 includes a plurality of nodes, such as the nodes 115a,b,c,d,e. According to some aspects, each of the nodes 115 have a public key, a private key, and a node identifier, which are used by the nodes 115 to secure files, authenticate files, and authenticate one another.

At 920, the IPFS network 110, upon receipt of the file to be uploaded, generates a unique hash key or value for the file. The unique hash value serves as a representation of the file as the file is distributed among the plurality of nodes 115 within the IPFS network 115. According to some aspects of the current subject matter, the unique hash value cannot be modified or altered.

At 930, the hash value generated by the IPFS network 110 is stored in a subset of the nodes 115 of the IPFS network. This enables for data to be spread across the IPFS network 110 of nodes, which enable efficient access and lookup between one another.

At 940, the IPFS network 110 generates a hash table. The unique hash value of the file is stored in the hash table. In particular, the hash table may include an indication of the file and the hash value. According to some aspects of the current subject matter, when a file is modified, a new hash key is appended in the hash table for the file.

At 950, the IPFS network 110 creates a blockchain representation, such as the blockchain representation 600, for the file. The blockchain representation includes at least the hash value of the file. The blockchain representation may also include an indication of previous hash, data, timestamp, and nonce, for example. By incorporating blockchain with the IPFS network 110, file commit transactions are validated and a clear ledger regarding time of modification and count of file edits is provided.

At 960, the file is provided, by the IPFS network 110, to a requesting device, which may include the user device 102 that initially provided the file to the IPFS network 110 or a device registered with the IPFS network 110. When a user requests a particular file, the hash key of the respective file is searched and the matching file is served from the nearest node. The file may be provided upon verification of the device making the request.

Figure 10:
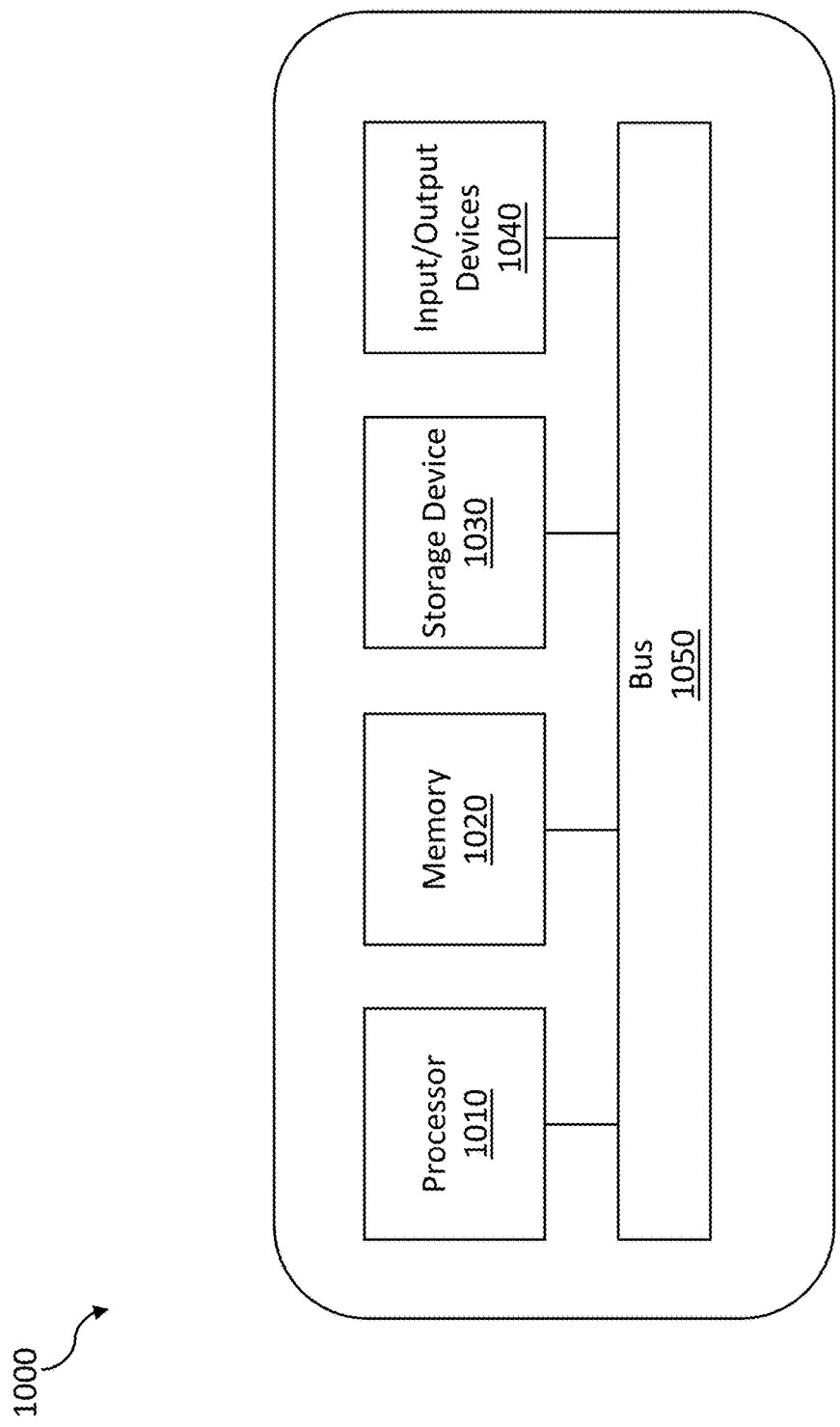
FIG. 10 depicts a block diagram illustrating a computing system consistent with implementations of the current subject matter.

FIG. 10 depicts a block diagram illustrating a computing system 1000 consistent with implementations of the current subject matter. Referring to FIGS. 1, 5, 7, 8, and 10, the computing system 1000 can be used to implement the IPFS network 110 and blockchain 600 integration and/or any components therein.

As shown in FIG. 10, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, the IPFS network 110. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
   receiving, by a processing device, a file to be uploaded to a private peer-to-peer network comprising an inter planetary file system, the private peer-to-peer network comprising a plurality of nodes including a sending user device providing the file to be uploaded, wherein the file to be uploaded is encrypted with a public key of a receiving user device;
   generating, by the processing device, a hash value for the file encrypted with the public key of the receiving user device, the hash value beginning with a predetermined identifier indicating that the file belongs to the private peer-to-peer network;
   storing, by the processing device, the hash value of the file in a distributed hash table in a subset of the plurality of nodes, wherein the distributed hash table comprises a Merkle directed acyclic graph, wherein a change to the hash file, which corresponds to a change to the file, is stored as a new block in the Merkle directed acyclic graph;
   creating, by the processing device, a blockchain representation of the file, the blockchain representation including at least the hash value of the file, a previous hash value of the file, an authentication nonce, and a time stamp to provide an audit trail for validation of changes to the file, wherein the authentication nonce comprises a random or pseudo-random number provided as part of an authentication to ensure that prior communications cannot be used in a replay attack;
   in response to a request from the receiving user device and upon verification of the receiving user device, providing, by the processing device, the file to the receiving user device, wherein the verification is based upon a public key exchange between the sending user device and the receiving user device and a determination that a hash of the public key of the receiving user device matches a corresponding node identifier for the receiving device, and wherein the file is provided by identifying, via the distributed hash table rather than the blockchain representation of the file, a nearest node of the plurality of nodes that contains the hash value;
   in response to the providing, receiving, by the processing device and from the receiving user device, a modified version of the file;
   in response to receiving the modified version of the file, generating, by the processing device, a new hash value for the modified version of the file, the new hash value assigned by the inter planetary file system;
   appending, by the processing device, the new hash value to the blockchain representation of the file; and
   updating, by the processing device, the distributed hash table with the new hash value for the modified version of the file, wherein the new hash value is stored as the new block in the distributed hash table comprising the Merkle directed acyclic graph.

2. The computer-implemented method of claim 1, further comprising:
   storing, by the processing device, the new hash value in the distributed hash table in a second subset of the plurality of nodes.

3. A system, comprising:
   at least one data processor; and
   at least one memory storing instructions which, when executed by the at least one data processor, result in operations comprising:
     receiving, by a processing device, a file to be uploaded to a private peer-to-peer network comprising an inter planetary file system, the private peer-to-peer network comprising a plurality of nodes including a sending user device providing the file to be uploaded, wherein the file to be uploaded is encrypted with a public key of a receiving user device;
     generating, by the processing device, a hash value for the file encrypted with the public key of the receiving user device, the hash value beginning with a predetermined identifier indicating that the file belongs to the private peer-to-peer network;
     storing, by the processing device, the hash value of the file in a distributed hash table in a subset of the plurality of nodes, wherein the distributed hash table comprises a Merkle directed acyclic graph, wherein a change to the hash file, which corresponds to a change to the file, is stored as a new block in the Merkle directed acyclic graph;

creating, by the processing device, a blockchain representation of the file, the blockchain representation including at least the hash value of the file, a previous hash value of the file, an authentication nonce, and a time stamp to provide an audit trail for validation of changes to the file, wherein the authentication nonce comprises a random or pseudo-random number provided as part of an authentication to ensure that prior communications cannot be used in a replay attack;

in response to a request from the receiving user device and upon verification of the receiving user device, providing, by the processing device, the file to the receiving user device, wherein the verification is based upon a public key exchange between the sending user device and the receiving user device and a determination that a hash of the public key of the receiving user device matches a corresponding node identifier for the receiving device, and wherein the file is provided by identifying, via the distributed hash table rather than the blockchain representation of the file, a nearest node of the plurality of nodes that contains the hash value;

in response to the providing, receiving, by the processing device and from the receiving user device, a modified version of the file;

in response to receiving the modified version of the file, generating, by the processing device, a new hash value for the modified version of the file, the new hash value assigned by the inter planetary file system;

appending, by the processing device, the new hash value to the blockchain representation of the file; and updating, by the processing device, the distributed hash table with the new hash value for the modified version of the file, wherein the new hash value is stored as the new block in the distributed hash table comprising the Merkle directed acyclic graph.

4. The system of claim 3, wherein the at least one memory storing instructions which, when executed by the at least one data processor, result in further operations comprising:
storing the new hash value in the distributed hash table in a second subset of the plurality of nodes.

5. A non-transitory computer-readable storage medium including program code, which when executed by at least one data processor, causes operations comprising:
receiving, by a processing device, a file to be uploaded to a private peer-to-peer network comprising an inter planetary file system, the private peer-to-peer network comprising a plurality of nodes including a sending user device providing the file to be uploaded, wherein the file to be uploaded is encrypted with a public key of a receiving user device;

generating, by the processing device, a hash value for the file encrypted with the public key of the receiving user device, the hash value beginning with a predetermined identifier indicating that the file belongs to the private peer-to-peer network;

storing, by the processing device, the hash value of the file in a distributed hash table in a subset of the plurality of nodes, wherein the distributed hash table comprises a Merkle directed acyclic graph, wherein a change to the hash file, which corresponds to a change to the file, is stored as a new block in the Merkle directed acyclic graph;

creating, by the processing device, a blockchain representation of the file, the blockchain representation including at least the hash value of the file, a previous hash value of the file, an authentication nonce, and a time stamp to provide an audit trail for validation of changes to the file, wherein the authentication nonce comprises a random or pseudo-random number provided as part of an authentication to ensure that prior communications cannot be used in a replay attack;

in response to a request from the receiving user device and upon verification of the receiving user device, providing, by the processing device, the file to the receiving user device, wherein the verification is based upon a public key exchange between the sending user device and the receiving user device and a determination that a hash of the public key of the receiving user device matches a corresponding node identifier for the receiving device, and wherein the file is provided by identifying, via the distributed hash table rather than the blockchain representation of the file, a nearest node of the plurality of nodes that contains the hash value;

in response to the providing, receiving, by the processing device and from the receiving user device, a modified version of the file;

in response to receiving the modified version of the file, generating, by the processing device, a new hash value for the modified version of the file, the new hash value assigned by the inter planetary file system;

appending, by the processing device, the new hash value to the blockchain representation of the file; and updating, by the processing device, the distributed hash table with the new hash value for the modified version of the file, wherein the new hash value is stored as the new block in the distributed hash table comprising the Merkle directed acyclic graph.

6. The non-transitory computer-readable storage medium of claim 5, causing operations further comprising:
storing the new hash value in the distributed hash table in a second subset of the plurality of nodes.

* * * * *